(12) United States Patent
Vapaakoski

(10) Patent No.: US 7,677,817 B2
(45) Date of Patent: Mar. 16, 2010

(54) DEVICE COMPRISING CAMERA ELEMENTS

(75) Inventor: Simo Vapaakoski, Tampere (FI)

(73) Assignee: Nokia Corporation, Espoo (FI)

( * ) Notice: Subject to any disclaimer, the term of this patent is extended or adjusted under 35 U.S.C. 154(b) by 128 days.

(21) Appl. No.: 11/227,992

(22) Filed: Sep. 14, 2005

(65) Prior Publication Data

US 2006/0056837 A1   Mar. 16, 2006

(30) Foreign Application Priority Data

Sep. 14, 2004   (FI) .................................. 20045342

(51) Int. Cl.
   *G03B 17/00* (2006.01)
(52) U.S. Cl. ....................... 396/439; 396/448
(58) Field of Classification Search ................. 396/439, 396/448, 450; 348/373, 376
   See application file for complete search history.

(56) References Cited

U.S. PATENT DOCUMENTS 7,126,626 B2 * 10/2006 Sawahara et al. ......... 348/14.02

2003/0036365 A1 * 2/2003 Kuroda ..................... 455/90
2004/0027474 A1 * 2/2004 Aoyama et al. ............. 348/335
2004/0048633 A1   3/2004 Sato et al.

FOREIGN PATENT DOCUMENTS

| DE | 19934507 | 2/2001 |
|---|---|---|
| EP | 1357726 | 10/2003 |
| EP | 1420568 | 5/2004 |
| EP | 1455529 | 9/2004 |
| EP | 1560421 | 8/2005 |
| EP | 1569450 | 8/2005 |
| WO | WO 0131893 | 5/2001 |
| WO | WO 2004015986 | 2/2004 |

* cited by examiner

*Primary Examiner*—Rodney E Fuller
(74) *Attorney, Agent, or Firm*—Ware, Fressola, Van Der Sluys & Adolphson LLP

(57) ABSTRACT

A device comprising a housing; a first camera element located on a first side of the housing for forming image information on a view seen by the first camera element; a second camera element located on a second side of the housing for forming image information on a view seen by the second camera element; an activator for providing a signal from either the first camera element or the second camera element according to a selection, the activator comprising a detector for detecting the selection; and a processor for processing the obtained image information.

17 Claims, 3 Drawing Sheets

DEVICE COMPRISING CAMERA ELEMENTS

CROSS-REFERENCE TO RELATED APPLICATIONS

This application claims priority under 35 USC §119 to Finnish Patent Application No. 20045342 filed on Sep. 14, 2004.

FIELD OF THE INVENTION

The invention relates to a device comprising at least a housing, a first camera element located on a first side of the housing for forming image information on a view seen by the first camera element, and a second camera element located on a second side of the housing for forming image information on a view seen by the second camera element. The invention also relates to a system comprising at least a housing, a first camera element located on a first side of the housing for forming image information on a view seen by the first camera element, and a second camera element located on a second side of the housing for forming image information on a view seen by the second camera element. The invention further relates to a method for controlling operation of a device comprising at least a housing, a first camera element located on a first side of the housing for forming image information on a view seen by the first camera element, and a second camera element located on a second side of the housing for forming image information on a view seen by the second camera element. The invention further relates to a module for a device comprising at least a housing, the module comprising a first camera element located on a first side of the housing for forming image information on a view seen by the first camera element, and a second camera element located on a second side of the housing for forming image information on a view seen by the second camera element. The invention relates to a computer program product comprising machine executable steps for controlling operation of a device comprising at least a housing, a first camera element located on a first side of the housing for forming image information on a view seen by the first camera element, and a second camera element located on a second side of the housing for forming image information on a view seen by the second camera element.

BACKGROUND OF THE INVENTION

Videotelephony services are evolving, meaning that there will be more mobile phones in the future which have two or more camera elements on two sides of the housing of the mobile phone. One of the camera elements (a back camera element) can be located on the back side which normally is directed away from the user of the mobile phone when the user holds the mobile phone in front of his/her face. The other camera element (a front camera element) is usually located on the front side of the mobile phone i.e. the other camera element is then directed towards the face of the user. In other words, during a video call, the front camera element is focused on the user, and the other party of the call can see the user on the display of the other party's phone. The back camera element can be used for shooting pictures or video with a camcorder application, and the display of the mobile phone can be used as a viewfinder.

When there are two camera elements, easy and intuitive selection of the active camera element has importance. During a video call the front camera element is normally used wherein the other party of the call can see the face of the user but sometimes there may be a need to switch to the back camera element e.g. to show the other party of the call what the user sees, and again back to the front camera element.

In prior art mobile phones the selection of the active camera element is done by pressing a key or keys of the keypad of the mobile phone or using some other selection method of the user interface (UI) of the mobile phone. This can be quite cumbersome and may not be very easy to perform during the call.

Some videotelephony capable phones have only one camera element, which can be mechanically turned in different directions (front and back) but it may not be easy to direct the view of the camera element to the correct direction.

Also when the camera element is turned from one direction to another the image seen by the camera element varies a lot. The image processing element of the camera element may interpret this kind of variation so that there is a need to transmit more accurate image information compared to a situation in which successive images only has a few differences between each other. Therefore, the phone may unnecessarily transmit image transmission during the movement (turning) of the camera element from one direction (e.g. from the view of the face of the user of the phone) to another direction (e.g. to the view which the user of the mobile phone sees). The other party of the call may not be interested in the images the camera element takes during the turning of the camera element.

SUMMARY OF THE INVENTION

In this application there is disclosed an invention for controlling handling of images of two or more camera elements of a device. The method is based on the idea that the optical path of at least one camera element is affected to form a selection signal for selecting the active camera element among the two or more camera elements. The optical path can be affected, for example, by a slide or other kind of cover which can be moved in front of one of the camera elements. To put it more precisely, the device according to the present invention is mainly characterised in that the device further comprises at least:
  a detector for detecting a state of a sensing element to form a selection,
  an activator for providing the signal from either the first camera element or the second camera element according to the selection; and
  an image processor element for processing the obtained image information.

The system according to the present invention is mainly characterised in that the system further comprises at least:
  a detector for detecting a state of a sensing element to form a selection,
  an activator for providing the signal from either the first camera element or the second camera element according to the selection, and
  an image processing element for processing the obtained image information.

The module according to the present invention is mainly characterised in that the module comprises at least:
  a detector for detecting a state of a sensing element to form a selection,
  an activator for providing the signal from either the first camera element or the second camera element according to the selection for processing the obtained image information of the activated camera element.

The method according to the present invention is mainly characterised in that the method comprises at least:

detecting a state of a sensing element to form a selection, and providing the signal from either the first camera element or the second camera element according to the selection for processing the obtained image information.

The computer program product according to the present invention is mainly characterised in that the computer program product comprises machine executable steps stored on a readable medium so that when executed by a processor, are for:

detecting a state of a sensing element to form a selection, and providing the signal from either the first camera element or the second camera element according to the selection for processing the obtained image information.

Using the present invention can make the selection of the active camera element easier and more intuitive to the user compared to camera selection using e.g. keys of the user interface of the device. The selection according to the present invention also gives clear indication of the currently active camera element.

DETAILED DESCRIPTION OF THE INVENTION

Figure 1:
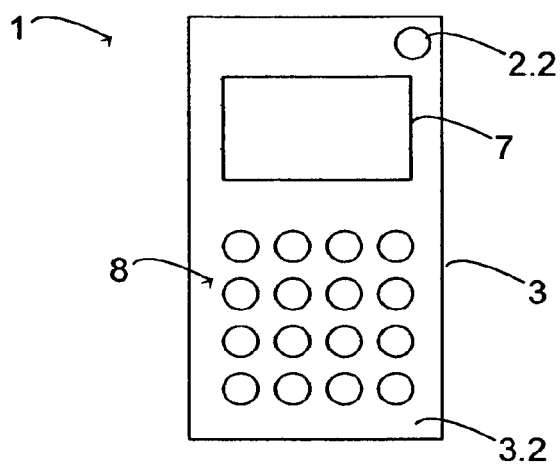
FIG. 1 presents a device according to an example embodiment of the present invention from the front side.
Figure 2A:
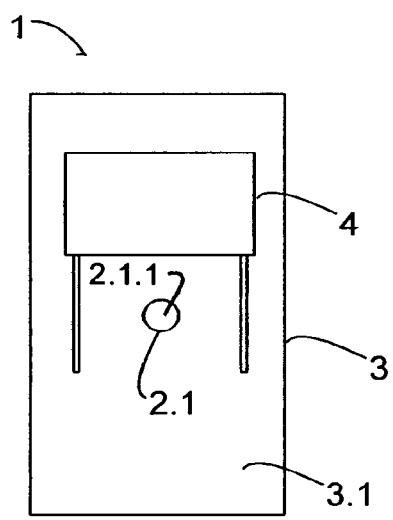
FIG. 2a presents a device according to an example embodiment of the present invention from the back side and the selection signal forming element in a first position.
Figure 2B:
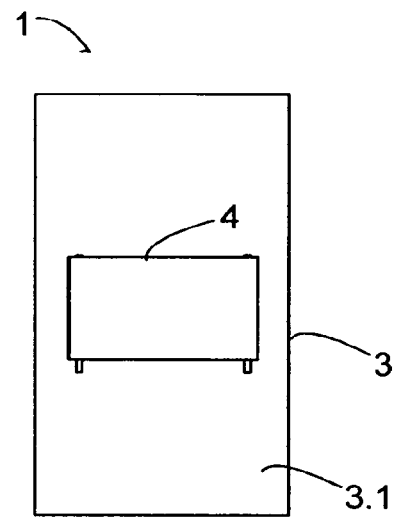
FIG. 2b presents the device of FIG. 2a having the selection signal forming element located in a second position.
Figure 3:
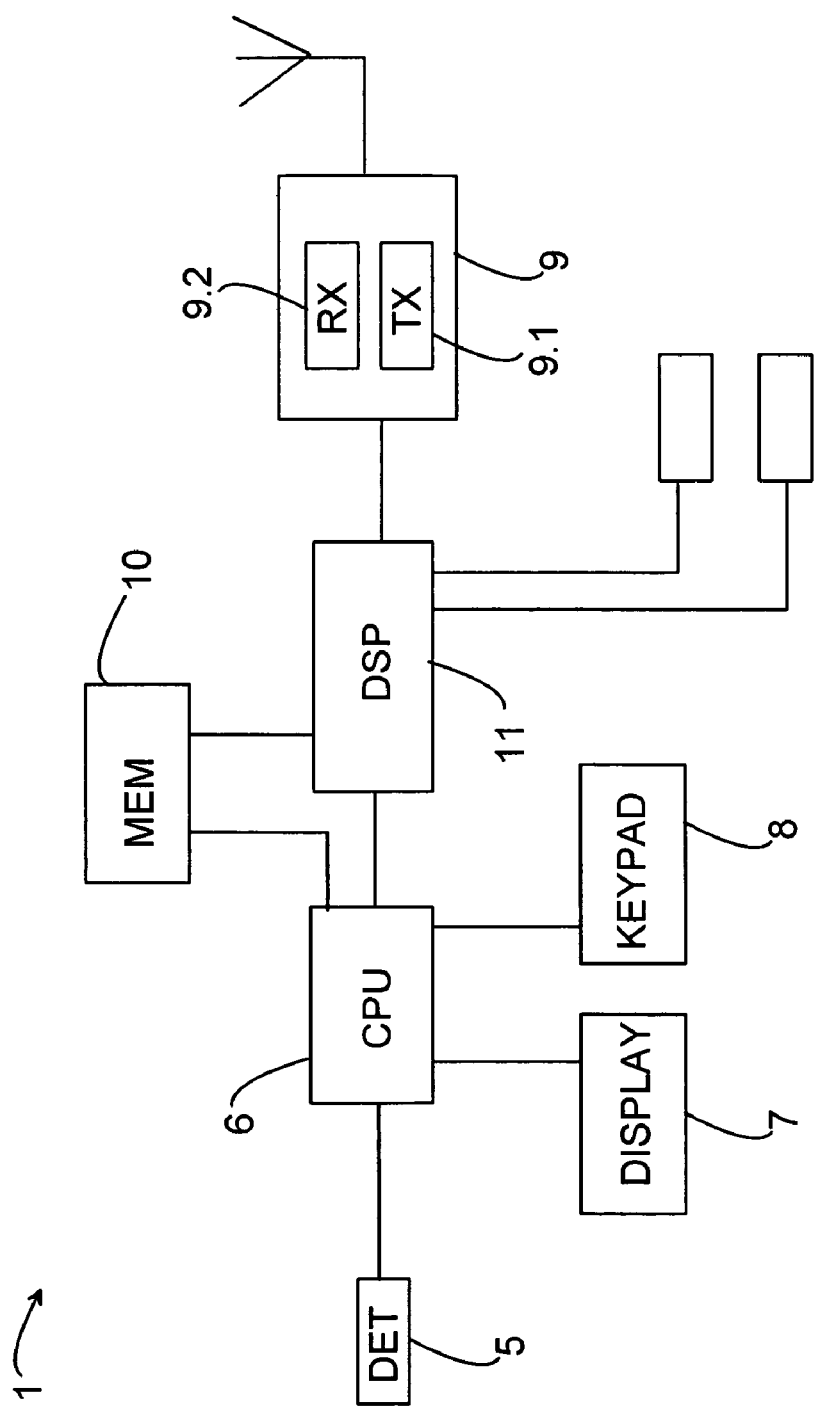
FIG. 3 shows a device according to an example embodiment as a simplified block diagram.
Figure 4:
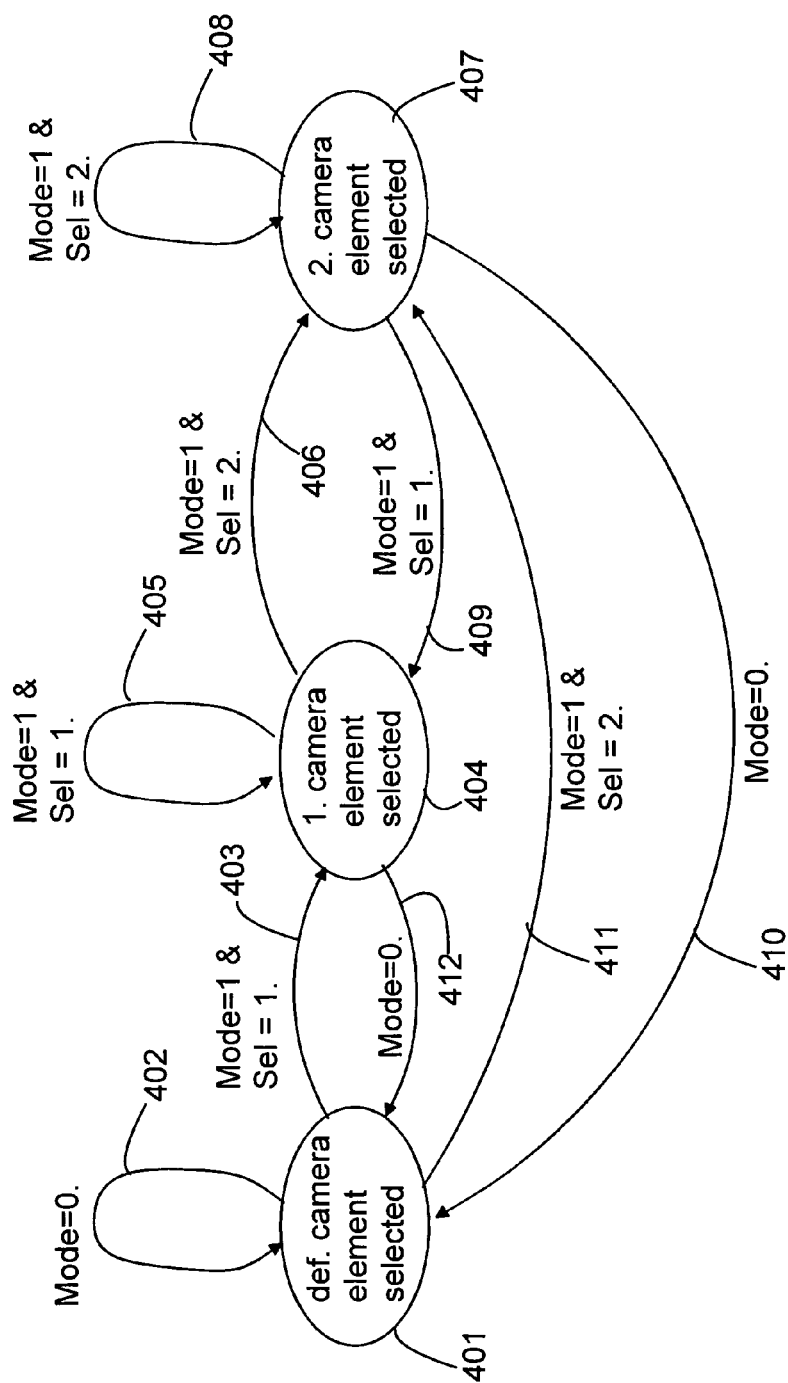
FIG. 4 shows a method according to an example embodiment as a simplified state diagram.

In the following the method according to an example embodiment will be described in more detail with reference to the state diagram of FIG. 4. First, it is assumed that the selection method is not yet active. This situation is represented by the first state 401 of FIG. 4. The arrow 402 depicts that this mode (Mode=0) will stay as long as the mode is not changed. In this mode the default camera element may be active or none of the camera elements is active. When the method is activated (the mode changes to another mode which is represented in FIG. 4 by Mode=1) the selection signal is examined to determine which camera element 2.1, 2.2 should be activated. The selection signal is formed by the detector 5 to indicate the position of the protective cover 4. The processing element 6 examines the selection signal. If the selection signal indicates that the first camera element 2.1 should be activated (Sel=1) i.e. the protective cover 4 is set to the first position, the state changes to the second state 404. This change is depicted by the arrow 403 in FIG. 4. The first camera element 2.1 is now activated (active camera element). Therefore the processor 6 instructs, for example, the digital signal processing element 11 to process the image signal of the first camera element 2.1. The protective cover 4 is not in the optical path of the first camera element 2.1 when in the first position of the protective cover 4 i.e. the protective cover 4 does not prevent light passing to the first camera element 2.1. The first camera element 2.1 forms an image signal on the basis of the light affecting on the light sensing elements (not shown) of the first camera module 2.1 which is known as such. The image signal of the first camera element 2.1 is a representation of the view the first camera element 2.1 "sees". Although the processing element 6 and the digital signal processing element 11 are depicted in FIG. 3 as separate elements it is obvious that they can also be implemented in one processing element and/or in a same circuit such as an application specific integrated circuit (ASIC).

The device 1 also comprises a detector 5 (FIG. 3) for detecting the position of the protective cover 4. The detector 5 can be, for example, an electromechanical switch, magnetic, optical or any other position recognition device. It is also possible that the detector 5 is implemented as a software of a processing element 6 of the device 1. The selection signal formed by the detector 5.1 on the basis of the position of the protective cover 4 is input to the processing element 6 of the device 1. The processing element 6 is, for example, a microprocessor or a digital signal processor. If the detector 5 is implemented through the use of software, the selection signal can be formed on the basis of the signal of one or more of the camera elements 2.1, 2.2 as will be described later in this application.

The device 1 of this example embodiment also comprises a display 7, a keyboard 8, a memory 10 and a mobile communication block 9 usually including a transmitter 9.1 and a receiver 9.2.

In the following the method according to an example embodiment will be described in more detail with reference to the state diagram of FIG. 4. First, it is assumed that the selection method is not yet active. This situation is represented by the first state 401 of FIG. 4. The arrow 402 depicts that this mode (Mode=0) will stay as long as the mode is not changed. In this mode the default camera element may be active or none of the camera elements is active. When the method is activated (the mode changes to another mode which is represented in FIG. 4 by Mode=1) the selection signal is examined to determine which camera element 2.1, 2.2 should be activated. The selection signal is formed by the detector 5 to indicate the position of the protective cover 4. The processing element 6 examines the selection signal. If the selection signal indicates that the first camera element 2.1 should be activated (Sel=1) i.e. the protective cover 4 is set to the first position, the state changes to the second state 404. This change is depicted by the arrow 403 in FIG. 4. The first camera element 2.1 is now activated (active camera element). Therefore the processor 6 instructs, for example, the digital signal processing element 11 to process the image signal of the first camera element 2.1. The protective cover 4 is not in the optical path of the first camera element 2.1 in the second position of the protective cover 4 i.e. the protective cover 4 does not prevent light passing to the first camera element 2.1. The first camera element 2.1 forms an image signal on the basis of the light affecting on the light sensing elements (not shown) of the first camera module 2.1 which is known as such. The image signal of the first camera element 2.1 is a representation of the view the first camera element 2.1 "sees". Although the processing element 6 and the digital signal processing element 11 are depicted in FIG. 3 as separate elements it is obvious that they can also be implemented in one processing element and/or in a same circuit such as an application specific integrated circuit (ASIC).

The image signal processed by the digital signal processing element 11 of the device 1 can be shown on the display 7 so that the user of the device 1 can see the image. In practice this means that the user sees her/his face when the device is in front of the user and the first side 3.1 of the housing of the device is directed to the user. The view seen by the first camera element 2.1 can be displayed as such or it can, for example, be displayed as a mirrored view. The image signal can also be transmitted by the transmitter 9.1 of the mobile communication block 9 to another device (not shown) either directly or via a communication network (not shown) wherein the user of the other device can see the face of the user of the device 1. The image signal may not be transmitted as such but the image signal may be compressed to reduce the amount of information to be transmitted between the devices.

The operational state will normally stay in the second state 404 as long as the following conditions are true: Mode=1 and Sel=1 (arrow 405). It should be noted here that the variables Mod and Sel and their values (Mod $\epsilon\{0,1\}$, Sel $\epsilon\{1,2\}$) are just non-limiting examples to clarify the invention but also other variables and values can be used with the present invention.

If the mode changes to indicate that the selection method is no longer active (Mod=0) the state returns to the first state 401 (arrow 412).

When the protective cover 4 is in the first position the image signal formed by the second camera element 2.2 is not processed in this example method.

When the protective cover 4 is positioned to the second position the detector 5 forms a different selection signal (Sel=2) compared with the situation in which the protective cover is in the first position. The processing element 6 examines the selection signal and determines that the protective cover is in the second position. This is interpreted so that the second camera element 2.2 is activated instead of the first camera element 2.1. Therefore the processing element 6 sends an indication to the digital signal processing element 11 to process the image signal of the second camera element 2.2. The state is changed to the third state 407. This is depicted by the arrow 406 when the previous state was the second state 404, and the arrow 411 when the previous state was the first state 401. The processed image signal of the second camera element 2.2 (i.e. the view seen by the second camera element) can now be displayed on the display 7 and transmitted to the other device. Hence, the user of the device 1 can use the second camera element 2.2 as a viewfinder and the user of the other device sees the same view on her/his device.

The transmission of the images from the device 1 to the other device may not be continuous (live view) but the user of the device 1 may instruct the device 1 what images to transmit (still images) or when a live image (video) will be transmitted. For example, when the second camera element 2.2 is activated the user of the device 1 looks the display to see the view seen by the second camera element 2.2 and changes, when necessary, the diversion of the device 1 (thus changing the diversion of the second camera element 2.2) to have a different view. When the view is what the user of the device 1 wants to show to the user of the other device, the user of the device 1 takes a picture by e.g. pressing a key of the keyboard 8. The key press is detected by, for example, the processing element 6 which instructs the digital signal processing element 11 to process the current image signal of the second camera module 2.2. In addition to that the processing element 6 instructs the mobile communication block 10 to transmit the image when the digital signal processing element 11 has it ready. The similar picture taking method may also be applicable when the first camera element 2.1 is activated.

That camera element 2.1, 2.2 which is not activated may be powered off when necessary. This may reduce the power consumption of the device. However, if the selection signal is formed on the basis of one of the camera elements 2.1, 2.2, that camera element can not be powered off when the detector 5 should be functioning.

The state of the device 1 usually remains in the third state 407 as long as the following conditions are true: Mode=1 and Sel=2 (arrow 408). The state can be changed from the third state to the second state 404 (arrow 409) if the selection signal indicates that the protective cover 4 is set to the first position (Sel=1) and the method is still active (Mode=1). or the state will be changed to the first state 401 (arrow 410) if the method is deactivated (Mode=0).

In the following the operation of another embodiment of the present invention will be described. In this embodiment the detector 5 is implemented in software of the digital signal processing element 11. The selection signal is formed on the basis of one of the camera elements 2.1, 2.2. Let us assume that the second camera module 2.2 is used in this purpose and that the second camera module 2.2 is by default the activated camera module. The digital signal processing element 11 processes the image signal formed by the second camera element 2.2. If the image signal indicates that there is a real image (a view) on the light sensing elements (not shown) of the second camera module 2.2, the digital signal processing element 11 determines that the second camera module 2.2 is the active one. If the user of the device 1 wants to change the first camera element 2.1 as the active camera element, the user can put her/his hand or some other object in front of the lens of the second camera element 2.2. This causes the image signal formed by the second camera element 2.2 to correspond to a dark image or be substantially equal on the whole area of the image. This information can be used to determine that the first camera element 2.1 should be activated. This embodiment can also be implemented so that the protective cover 4 is such that the transparency of it can be controlled for example by a control signal. The protective cover 4 is e.g. an LCD device wherein the transparency can be changed by changing the polarity of the LCD device, which is known as such.

In an alternative embodiment of the present invention the first 2.1 and second camera element 2.2 are both active at the same time in the manner that both camera elements 2.1, 2.2 are taking images (still or video images). The activator 6 determines which images of the images formed by the first 2.1 and the second camera element 2.2 should be processed. Therefore, if the selection signal indicates that the first camera element 2.1 is selected, the activator 6 provides, for example, a control signal according to the selection for connecting the image signal of the first camera element 2.1 to the digital signal processing element 11. If the selection signal indicates that the second camera element 2.2 is selected, the activator 6 provides, for example, a control signal according to the selection for connecting the image signal of the second camera element 2.2 to the digital signal processing element 11. It is also possible that both signals obtained by the camera elements 2.1, 2.2 are connected to the digital signal processing element 11 but digital signal processing element 11 is instructed, according to the selection, to process only the image signal of the selected camera element 2.1, 2.2. In some implementations the image signal may be directed via the activator wherein the activator 6 provides the image signal of the selected camera element 2.1, 2.2 to the digital signal processing element 11.

It is also possible that the device 1 comprises more than two camera elements. For example, the device may comprise a third camera element (not shown) located beside the second camera element 2.2 and directed to substantially the same direction than the second camera element 2.2. The image signals of the second and third camera elements can then be used to form a three dimensional view.

The invention can also be implemented as a module which can be connected with a device having two or more camera elements. The detector may be implemented in the module or in the device. The module examines the selection signal and forms the necessary control information for the processing element(s) 6, 11 to select the image signal for processing, displaying and/or transmission.

The method according to the present invention is not necessarily always in use when the device 1 is powered on. For example, if the device 1 comprises videotelephony properties the selection of the camera element can be adapted to be in operation during a video call. It is also possible to implement a user definable set-up procedure with which the user can set the conditions for using the selection method in the device 1.

The invention is not solely restricted to the above described embodiments but it can be amended within the scope of the appended claims.

What is claimed is:

1. An apparatus comprising:
    a housing;
    a first camera element located on a first side of the housing configured to form image information of a view seen by the first camera element;
    a second camera element located on a second side of the housing configured to form image information of a view seen by the second camera element;
    a cover movable between a first position, in which the view of the first camera element is at least partly uncovered, and a second position, in which the view of the first camera element is covered;
    wherein the apparatus is configured to obtain user set conditions, and the apparatus further comprises:
    a detector configured to detect the position of the cover and to form a selection according to the conditions and the detected position of the cover;
    an activator configured to provide a signal from either the first camera element or the second camera element according to the selection; and
    an image processing element configured to process the obtained image information.

2. The apparatus according to claim 1, wherein the activator is adapted to activate either the first camera element if the selection indicates that the cover is in the first position, or the second camera element if the selection indicates that the cover is in the second position.

3. The apparatus according to claim 1, the detector comprising
    an input for inputting image information at least from one of the camera elements; and
    an analyzer for analyzing the image information from said one of the camera elements, wherein the detector is adapted to indicate to the activator that the second camera element is to be selected if the analyzed image information indicates that the whole view seen by the first camera element is substantially constant.

4. The apparatus according to claim 3, wherein the detector is adapted to signal the activator that the second camera element is to be selected if the analyzed image information indicates that one of the following conditions is true:
    the whole view seen by the first camera element is substantially dark, or
    the whole view seen by the first camera element is substantially constant.

5. The apparatus according to claim 1, comprising a display for displaying at least image information of the first camera element, wherein the first camera element is used as a viewfinder when the first camera element is activated.

6. The apparatus according to claim 1, wherein the second camera element is adapted to be used at least as a camera element for viewing the face of a user of the device.

7. The apparatus according to claim 1, comprising a transmitter for transmitting image information of the signal provided by said activator from the device.

8. The apparatus according to claim 1, wherein the activator is adapted to activate one camera element at a time of the first and second camera elements, wherein the image processing element is adapted to process the obtained image information from the activated camera element.

9. The apparatus according to claim 1, wherein:
    the apparatus has a communication unit configured to enable videotelephone operation to the user; and
    the conditions define that during a video call, the selection is adapted.

10. A module for an apparatus comprising at least a first and a second camera element, said first camera element located on a first side of a housing for forming image information of a view seen by the first camera element, and said second camera element located on a second side of the housing for forming image information of a view seen by the second camera element, wherein the apparatus further comprises a cover movable between a first position, in which the view of the first camera element is at least partly uncovered, and a second position, in which the view of the first camera element is covered;
    wherein the module is configured to obtain user set conditions and the module comprises at least:
        a detector configured to detect the position of the cover and to form a selection according to the conditions and the detected position of the cover;
        an activator configured to provide a signal from either the first camera element or the second camera element according to the selection for processing the obtained image information; and
        an image processing element configured to process the obtained image information.

11. The module according to claim 10, wherein:
    the apparatus has a communication unit configured to enable videotelephone operation to the user; and
    the conditions define that during a video call, the selection is adapted.

12. A method comprising:
    detecting a position of a cover to form a selection in an apparatus comprising a housing, a first camera element on one side of the housing and a second camera element on a second side of the housing, the cover being movable between a first position, in which the view of the first camera element is at least partly uncovered, and a second position, in which the view of the first camera element is covered;
    obtaining conditions from a user of the apparatus; and
    providing a signal from either a first camera element located on a first side of a housing for forming image information of a view seen by the first camera element or a second camera element located on a second side of the housing for forming image information of a view seen by the second camera element according to the selection and the conditions for processing the obtained image information.

13. The method according to claim 12, further comprising:
    inputting image information at least from one of the camera elements;
    analyzing the image information from said at least one of the camera elements; and
    indicating that the second camera element is to be selected if the analyzed image information indicates that the whole view seen by the first camera element is substantially constant.

14. The method according to claim 12, wherein:
the apparatus has a communication unit configured to enable videotelephone operation to the user; and
the conditions define that during a video call, the selection is adapted.

15. A computer program product comprising machine executable instructions stored on a readable medium so that when executed by a processor cause the processor to select a camera element among at least a first and a second camera element, said first camera element located on a first side of a housing for forming image information of a view seen by the first camera element, and said second camera element located on a second side of the housing for forming image information of a view seen by the second camera element, wherein there is a cover moveable between a first position, in which the view of the first camera element is at least partly uncovered, and a second position, in which the view of the first camera element is covered;
wherein the computer program product comprises machine executable instructions configured to cause the processor to:
detect a state of the cover to form a selection,
obtain conditions from a user of the apparatus; and
providing a signal from either the first camera element or the second camera element according to the conditions and the selection for processing the obtained image information.

16. The computer program product according to claim 15, wherein:
the apparatus has a communication unit configured to enable videotelephone operation to the user; and
the conditions define that during a video call, the selection is adapted.

17. An apparatus comprising:
a housing;
first means, located on a first side of the housing, for forming image information of a view seen by the first means;
second means, located on a second side of the housing, for forming image information of a view seen by the second means;
means for covering, the means for covering being movable between a first position, in which the view of the first camera element is at least partly uncovered, and a second position, in which the view of the first camera element is covered;
means for obtaining user set conditions;
means for detecting the position of the means for covering and for forming a selection according to the conditions and the detected position of the means for covering;
means for providing a signal from either the first means or the second means according to the selection; and
means for processing the obtained image information.

* * * * *